United States Patent [19]

Feichtinger

[11] Patent Number: 4,509,264
[45] Date of Patent: Apr. 9, 1985

[54] SENSING HEAD WITH OVERLOAD PROTECTION

[75] Inventor: Kurt Feichtinger, Palling, Fed. Rep. of Germany

[73] Assignee: Dr. Johannes Heidenhain GmbH, Traunreut, Fed. Rep. of Germany

[21] Appl. No.: 518,930

[22] Filed: Aug. 1, 1983

[30] Foreign Application Priority Data

Aug. 12, 1982 [DE] Fed. Rep. of Germany ....... 3229991

[51] Int. Cl.³ ............................................... G01B 3/00
[52] U.S. Cl. ................................ 33/169 R; 33/172 B; 33/174 L
[58] Field of Search ............ 33/169 R, 172 E, 174 L, 33/149 J, 172 B, DIG. 6; 403/25, 26, 43, 111, 119–121, 137, 138, 142, 144

[56] References Cited

U.S. PATENT DOCUMENTS

| 3,922,791 | 12/1975 | Maxey, Sr. et al. | 33/174 L |
| 3,991,477 | 11/1976 | Zipin et al. | 33/172 E |
| 4,153,998 | 5/1979 | McMurtry | 33/172 E |
| 4,254,554 | 3/1981 | Germano et al. | 33/169 R |
| 4,352,246 | 10/1982 | Hauert | 33/174 L |

FOREIGN PATENT DOCUMENTS

| 1548326 | 8/1925 | Fed. Rep. of Germany .... 33/174 L |
| 2712181 | 7/1955 | Fed. Rep. of Germany .... 33/174 L |
| 1028792 | 5/1959 | Fed. Rep. of Germany .... 33/174 L |
| 2242355 | 10/1974 | Fed. Rep. of Germany .... 33/174 L |
| 2121246 | 5/1979 | Fed. Rep. of Germany .... 33/172 E |
| 2804398 | 12/1979 | Fed. Rep. of Germany .... 33/174 L |
| 2841548 | 4/1980 | Fed. Rep. of Germany .... 33/174 L |
| 1932010 | 6/1980 | Fed. Rep. of Germany .... 33/174 L |
| PCT/SU79/00134 | 12/1979 | PCT Int'l Appl ............ 33/174 L |
| 1599758 | 10/1981 | United Kingdom ............ 33/174 L |

Primary Examiner—Willis Little
Attorney, Agent, or Firm—Willian, Brinks, Olds, Hofer, Gilson & Lione Ltd.

[57] ABSTRACT

A sensing head is disclosed which includes an overload protection arrangement against excessive deflection of a sensing pin of the sensing head. This overload protection system includes a recess defined in the sensing head casing and an end piece carried by a receiving mandrel, which end piece is sized to fit within the recess and is shaped as a truncated cone. The spatial centering of the sensing head casing with respect to the machine spindle, which is defined by the axis of the receiving mandrel, is accomplished by precision bearings. A spring washer is provided which establishes a closed linkage connection between the receiving mandrel and the sensing head casing.

5 Claims, 1 Drawing Figure

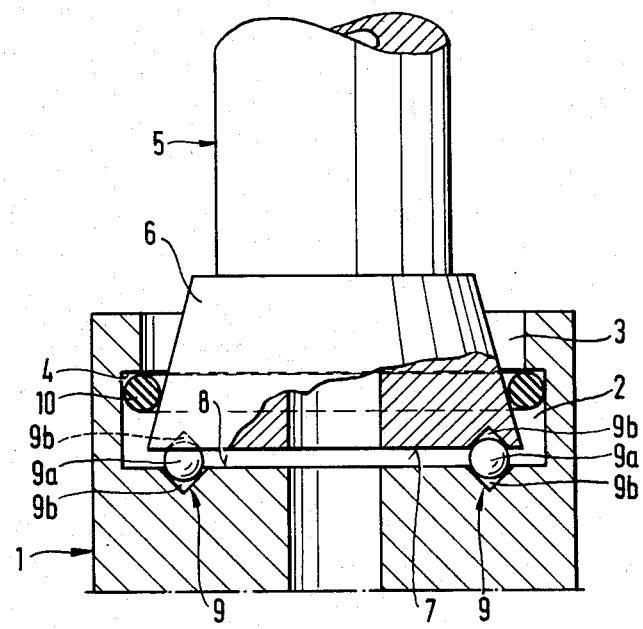

SENSING HEAD WITH OVERLOAD PROTECTION

BACKGROUND OF THE INVENTION

The present invention relates to an overload protection system for a sensing head of the type used with measuring or processing machines, in which the sensing head comprises a sensing head casing and a mandrel is used for mounting the sensing head to the measuring or processing machine.

A wide variety of mechanical zero sensing arrangements are known for machine tools (German DE-OS No. 15 48 326) and for measuring and testing instruments (German Patent DE-PS No. 10 28 792) which are provided with a spring type overload protection arrangement.

Furthermore, sensing heads are known for multicoordinate measuring or processing machines in which the deflection of a sensing pin by contact with a workpiece triggers an electrical signal (German DE-AS No. 19 32 010 and British Pat. No. 1,599,758). The sensing pins of the sensing heads described in these two documents assume a rest position automatically, which is extremely exactly defined as a zero position. For many applications the sensing pin must return to the zero position after deflection with an accuracy of 1 micron, since many measuring processes are numerically controlled, and therefore must operate automatically. Typically, an adjustment of the scanning pin is therefore not provided in such sensing heads.

Such sensing heads can be relatively expensive components, and therefore correspondingly high costs arise when the sensing pin of the sensing head is damaged due to excessive deflection of the sensing pin.

SUMMARY OF THE INVENTION

The present invention is directed to an improved sensing head which is provided with an overload protection arrangement that makes possible an exact positioning of a sensing head casing with respect to a mandrel so as to provide a high accuracy of positioning. The preferred embodiments of this invention can be manufactured in a particularly simple and economical manner while providing excellent protection for the sensing head against damage due to excessive stresses.

According to this invention, a sensing head of the type described initially above is provided with means for defining a recess in the sensing head casing, which recess defines an undercut region adjacent an opening in the casing and a first base surface. An end piece is secured to the mandrel, and this end piece defines a truncated conical shape which comprises a second base surface. The end piece is sized to pass into the recess through the opening, with the second base surface adjacent to the first base surface. At least three precision bearings are disposed between the first and second base surfaces to precisely position the casing with respect to the end piece in a predetermined orientation, and a resilient element is positioned to bias the first and second base surfaces together to hold the casing in the predetermined orientation with respect to the mandrel and the end piece. Thus, the recess, the end piece, the bearings and the resilient element all cooperate to provide overload protection against excessive tilting forces on the casing, while maintaining a precisely determined rest position.

An important advantage of the preferred embodiment of the present invention is that the entire overload protection system is made up of only two easily produceable components which are positioned with respect to one another by commercially standard elements such as spring rings and ball bearings. Furthermore, once these embodiments are assembled in the simple manner described below, no expensive readjustment procedure is required.

The invention itself, together with further objects and attendant advantages, will best be understood by reference to the following detailed description, taken in conjunction with the accompanying drawing.

BRIEF DESCRIPTION OF THE DRAWING

The drawing is a cross-sectional view of a presently preferred embodiment of the present invention.

DETAILED DESCRIPTION OF THE PRESENTLY PREFERRED EMBODIMENTS

Turning now to the drawing, the present invention is directed to an overload protection arrangement for a sensing head of a measuring or processing machine. This sensing head defines a sensing head casing 1 which is partially shown in the drawing, and this sensing head casing 1 is mounted to the measuring or processing machine by means of a mandrel 5. The exact structure of the sensing head 1 in regions not shown in the drawing forms no part of the present invention, and a wide variety of sensing heads can be used. Merely by way of illustration, the sensing head disclosed in my co-pending German patent application No. P 32 20 992.3, filed Aug. 12, 1982 and assigned to the assignee of the present invention, discloses one suitable sensing head.

The upper zone of the sensing head casing 1 which is facing in the direction of a spindle (not shown) of the measuring or processing machine defines a recess 2. This recess 2 defines an opening 3 which is aligned with the aforementioned spindle. The opening 3 is smaller in diameter than the recess 2 such that an undercut region 4 is defined. A receiving mandrel 5 which is installed in a manner familiar to those skilled in the art into the spindle (not shown) carries at its distal end a truncated conical end piece 6. This end piece defines a base surface 7 which defines three pyramidal recesses 9b which act as precision bearing components and are distributed symmetrically around the circumference of the base surface 7.

The recess 2 defines a base surface 8 which in a similar manner defines three precision bearing components in the form of pyramidal recesses 9b which are aligned with the recesses 9b defined in the base surface 7. As shown in the drawing, each of the recesses 9b is in the shape of a pyramidal recess or apex extending into the respective base surface, and the three pairs of aligned recesses 9b are separated from one another by an angle of 120° such that when the sensing head casing 1 is placed centrally with respect to the mandrel 5, each of the three pairs of recesses 9b is precisely aligned. Three commercially standard precision balls 9a, such as those used for ball bearings, are positioned partially within the aligned upper and lower pyramidal recesses 9b in order to orient the surface 7 precisely parallel with respect to the surface 8. The three precision bearings, each made up of a ball 9a and a pair of aligned recesses 9b, ensure a precisely reproduceable rest position of the sensor head casing 1 with respect to the receiving mandrel 5, and thereby with respect to the machine spindle (not shown).

A resilient spring washer 10 is positioned in the undercut region such that it is compressed between the generatrix surface of the truncated cone 6 and the undercut surface 4 of the recess 2 in order to generate a biasing force tending to urge the base surfaces 7 and 8 together.

In the event excessive tilting forces are applied to the sensing pin (not shown) and therefore to the casing 1 of the sensing head, the sensing head casing 1 is allowed to tilt with respect to the receiving mandrel 5 against the biasing force supplied by the spring washer 10. In this way, an important degree of overload protection is provided against excessive tilting forces.

In order to assemble the embodiment shown in the drawing, the balls 9a are positioned in respective ones of the pyramidal recesses 9b in the recess 2, and then the end piece 6 is fitted into the recess 2 so as to capture the three balls 9a. At this point, the spring washer 10 is inserted in the recess 2 so as to bear on the conical surface of the end piece 6. In this way, a predetermined rest position is automatically and simply re-established without complex adjustment procedures.

The spring element 10 can also be constructed as an elastomeric O-ring.

Of course, it should be understood that a range of changes and modifications to the preferred embodiment described above will be apparent to those skilled in the art. For example, the precision bearings described above can be replaced by other types of precision bearings, for example, V-bearings or bearings which incorporate 3 balls in the middle of which the bearing ball is placed. It is therefore intended that the foregoing detailed description be regarded as illustrative rather than limiting, and that it be understood that it is the following claims, including all equivalents, which are intended to define the scope of this invention.

I claim:

1. In a sensing head for a measuring or processing machine, wherein the sensing head comprises a sensing head casing and a mandrel adapted for mounting to the measuring or processing machine, the improvement comprising:

means for defining a recess in the casing, which recess defines an undercut region adjacent an opening in the casing and a first base surface;

an end piece secured to the mandrel and having a truncated conical shape which comprises a second base surface and a conical surface, said end piece sized to pass into the recess through the opening with the second base surface opposed to the first base surface;

at least three precision bearings disposed between the first and second base surfaces to position the casing precisely with respect to the end piece in a predetermined orientation; and a resilient element positioned against the conical surface in the undercut region of the recess to bias the first and second base surfaces together to hold the casing in the predetermined orientation with respect to the mandrel and the end piece;

said recess, end piece, bearings and resilient element cooperating to provide overload protection against excessive tilting forces on the casing.

2. The invention of claim 1 wherein each of the precision bearings comprises means for defining aligned pyramidal recesses in the first and second base surfaces and a ball disposed partially in each of the aligned recesses.

3. The invention of claim 1 wherein the three bearings are symmetrically disposed around marginal portions of the first and second base surfaces.

4. The invention of claim 1 wherein the resilient element comprises a resilient ring disposed in the undercut region between the end piece and the casing.

5. In a sensing head for a measuring or processing machine, wherein the sensing head comprises a sensing head casing and a mandrel adapted for mounting to the measuring or processing machine, the improvement comprising:

means for defining a recess in the casing, which recess defines an undercut region adjacent an opening in the casing and a first base surface aligned with the opening, said first base surface defining three first pyramidal recesses disposed symmetrically around a marginal edge portion of the first base surface;

a truncated cone secured to an end of the mandrel, said cone defining a second base surface and a truncated conical surface, said second base surface defining three second pyramidal recesses oriented to align with respective ones of the first pyramidal recesses, said cone sized to fit within the recess such that the first and second base surfaces confront one another with the respective first and second pyramidal recesses in alignment and the conical surface confronts the undercut region of the recess;

three spherical balls, each partially disposed in a respective pair of aligned first and second pyramidal recesses to maintain a separation between the first and second base surfaces; and a resilient ring disposed in the undercut region and compressed between the casing and the conical surface in order to bias the first and second base surfaces together to hold the balls securely captured between the respective pair of aligned first and second pyramidal recesses in order to maintain the casing in a predetermined orientation with respect to the mandrel while providing overload protection against excessive tilting forces on the casing.

* * * * *

UNITED STATES PATENT AND TRADEMARK OFFICE
CERTIFICATE OF CORRECTION

PATENT NO. : 4,509,264
DATED : April 9, 1985
INVENTOR(S) : Kurt Feichtinger

It is certified that error appears in the above-identified patent and that said Letters Patent is hereby corrected as shown below:

In column 2, line 33, please delete "P 32 20 992.3," and substitute therefor --P 32 29 992.3,--.

Signed and Sealed this

Fifteenth Day of July 1986

[SEAL]

Attest:

DONALD J. QUIGG

Attesting Officer

Commissioner of Patents and Trademarks